(12) United States Patent
Lee et al.

(10) Patent No.: US 7,726,039 B2
(45) Date of Patent: Jun. 1, 2010

(54) TAPE MEASURE HOUSING

(75) Inventors: Barry Howard Lee, Rayleigh Essex (GB); Michael John Levick, Southend-on-Sea Essex (GB)

(73) Assignee: Fisco Tools Limited, Essex (GB)

( * ) Notice: Subject to any disclaimer, the term of this patent is extended or adjusted under 35 U.S.C. 154(b) by 286 days.

(21) Appl. No.: 11/665,355

(22) PCT Filed: Sep. 29, 2005

(86) PCT No.: PCT/GB2005/003739

§ 371 (c)(1),
(2), (4) Date: Jun. 26, 2007

(87) PCT Pub. No.: WO2006/040510

PCT Pub. Date: Apr. 20, 2006

(65) Prior Publication Data

US 2009/0044419 A1    Feb. 19, 2009

(30) Foreign Application Priority Data

Oct. 13, 2004  (GB) ................................. 0422760.9

(51) Int. Cl.
*G01B 3/10* (2006.01)
(52) U.S. Cl. ......................................................... 33/769

(58) Field of Classification Search ................... 33/755, 33/759, 760, 768, 769
See application file for complete search history.

(56) References Cited

U.S. PATENT DOCUMENTS

| 4,275,503 A * | 6/1981 | Bergkvist ..................... 33/757 |
| 4,527,334 A | 7/1985 | Jones et al. |
| 6,182,916 B1 | 2/2001 | Lin |
| 2004/0064962 A1 * | 4/2004 | Liu ............................. 33/758 |

FOREIGN PATENT DOCUMENTS

| GB | 2 342 086 A | 4/2000 |
| WO | 2004/013570 A1 | 2/2004 |

* cited by examiner

*Primary Examiner*—G. Bradley Bennett
(74) *Attorney, Agent, or Firm*—Buchanan Ingersoll & Rooney PC

(57) ABSTRACT

The invention provides a tape measure housing having resilient material located at its outersurface. The resilient material defines one or more gas-filled cavities, each of which is located on a line tangential to an outer wall of the housing between the outer wall of the housing and an outer wall of the resilient material. This provides improved shock protection.

14 Claims, 3 Drawing Sheets

TAPE MEASURE HOUSING

This application is a National Stage filing under 35 U.S.C. §371 of International Application No. PCT/GB2005/003739, filed on Sep. 29, 2005, now published as WO 2006/040510, which in turn claims priority to British Application No. 0422760.9, filed Oct. 13, 2004, the entire contents of which are incorporated herein by reference.

FIELD

This invention relates to a housing for a tape measure and to a tape measure including such a housing.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art.

It is well known to provide a flexible short tape measure wound onto a spool such that the tape measure can be unwound from the spool for use and then retracted after use for convenient storage. A spindle is usually formed on or connected to the housing that contains the wound tape measure spool and return spring. The housing is usually formed in two parts, one part bearing the spindle on which the spool is mounted, and the second part coordinating with the first part to either wholly or partially enclose the tape measure. The tape measure is wound on the spool. In either case, the complete housing having an opening through which the tape measure can be extended or retracted.

In addition, it is known to provide a flexible long tape measure which is connected by a leader to a winding drum within a housing. The drum is usually formed integrally with or connected to a winding centre and winding handle used to wind the long tape measure onto the drum. The drum is usually at least partially enclosed by the housing. The housing is usually formed in at least two parts and has an opening through which the long tape measure can be extended and retracted.

For ease of manufacture, tape measure housings are typically made from molded plastics material. This allows the casing to be relatively lightweight and easy to handle. The molding operation also allows the incorporation of detailed functional shapes into the housing in a single forming step.

A particular problem associated with tape measure housings made from molded plastic materials is that due to their relative stiffness, they may be quite brittle and prone to breakage during impact.

There are known tape measures which have overjackets formed of resilient material. That is, a jacket is formed around the tape measure after the tape measure has been assembled, or the tape measure is inserted into a jacket after assembly of the tape measure. The jackets are typically provided for the purpose of improving the grip provided to a user. If made from resilient material, they have a further effect which is a limited shock-protection effect.

There are also known tape measures which have pads of resilient material which are attached to the tape measure housing, either by adhesive or by molding in (for example as described in WO 2004/013570). These resilient pads are often located at vulnerable locations on the outer surface of the housing, e.g., around the tape mouth (the opening in the housing from which the measuring blade is drawable) and the corners of the housing.

The present inventors have realized that by including gas-filled (e.g., air-filled) cavities in the resilient material provided on prior art housings, the protection advantages offered by the resilient material can be improved upon.

Accordingly the present invention provides, a tape measure housing having resilient material located at its outer surface, wherein the resilient material defines one or more gas-filled cavities, each of which is located on a line tangential to an outer wall of the housing between the outer wall of the housing and an outer wall of the resilient material.

The outer surface of the housing is the surface which is impacted upon when tape measure housing is dropped.

The gas-filled cavities may be open to the atmosphere, and may have an opening on at least one outer surface of the resilient material, or an opening on at least two outer surfaces of the resilient material. Such cavities can be described as 'blind' and 'through' cavities respectively. Alternatively, the gas-filled cavities may not have an opening on at least one outer surface of the resilient material. Such cavities can be described as 'internal' cavities.

If the cavities are open to the atmosphere, then the gas filling them is air.

Typically the cavities described above run parallel to the surface of the housing which they are intended to protect, but may run in a different direction, particularly to provide a visual effect.

The gas-filled cavities may be not open to the atmosphere. In this case, the gas in the cavities may be air or it may be another gas, or mixture of gases, such as nitrogen and carbon dioxide.

The tape measure housing may be made from any suitable molded plastics material, e.g., ABS, polycarbonate, polystyrene, polyester, nylon and acetal. Of these ABS is preferred.

The resilient material may be an elastomeric material such as, for example, TPE, TPU, melt processable rubber and elastomeric alloy. Of these TPE and TPU are preferred.

The resilient material may be used to hold a housing comprising two or more parts together, in addition to, or as a replacement for, conventional securing means. Housings wherein resilient material replaces conventional securing means are described in co-pending application GB 0416509.8, filed on 23 Jul. 2004.

The resilient material may be attached to the housing in a number of ways. It may be molded onto the housing, adhered to the housing, or if in the form of a jacket, slipped onto the housing after the housing is assembled. Of these, molding-on and adhesion are the preferred options, with molding-on being the most preferred option.

If the housing is for a short tape, then it usually has two substantially parallel faces which define between them a space for a spooled measuring tape, said space being circumscribed by an edge having a mouth through which the tape could be drawn. In this case, the resilient material which defines the cavities preferably covers the whole width of said edge and the cavities extend across at least 50%, preferably 60% or even 75%, of said width. The resilient material may extend along whole or part of the edge, and preferably extends along at least 50% of the length of the edge.

The gas-filled cavities are preferably bounded on both sides, along the line tangential to an outer wall of the housing between the outer wall of the housing and an outer wall of the resilient material, with resilient material. This results in there being resilient material between the cavity and the outer wall of the housing.

The gas-filled cavities are preferably of a predetermined volume, which volume is preferably sufficient to provide additional shock protection when compared against a measure where the cavity is not present.

The gas-filled cavities tend to be elongate. It is preferred that the cross-section of the elongate gas-filled cavities is least 1 mm$^2$, 5 mm$^2$, or even 10 mm$^2$. It is also preferred that the cross-section of the elongate gas-filled cavities is less than or equal to 75 mm$^2$, 50 mm$^2$ or even 25 mm$^2$.

BRIEF DESCRIPTION OF THE DRAWING FIGURES

Preferred embodiments of the invention will now be described, by way of example only, with reference to the accompanying drawings, in which:

FIG. 1b is a rear view of the tape measure housing of FIG. 1a;

DETAILED DESCRIPTION

Figure 1A:
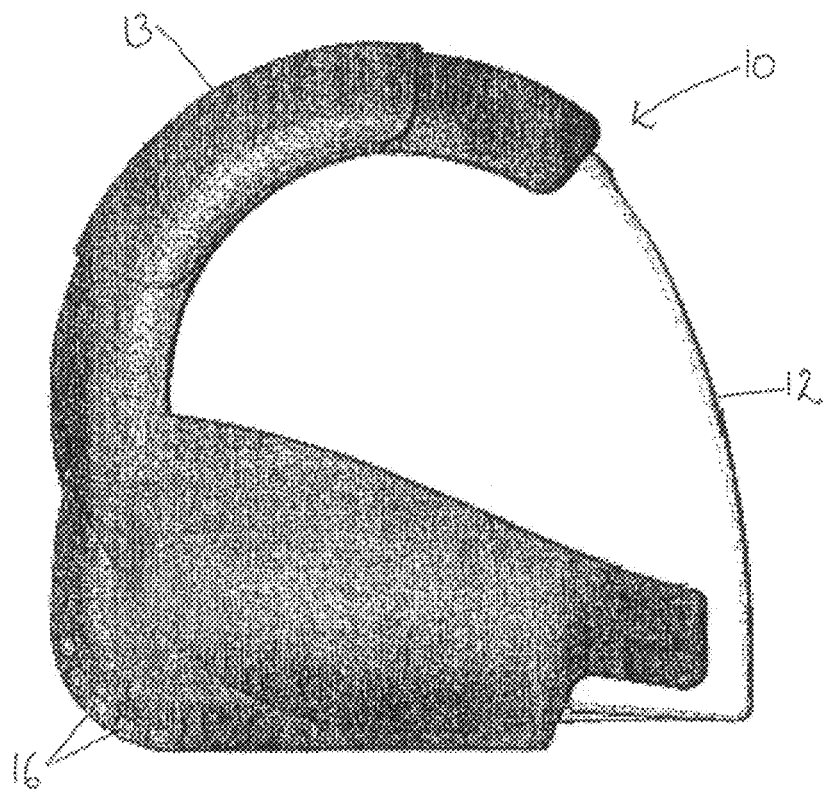
FIG. 1a is a front view of a tape measure housing of the invention.
Figure 1B:
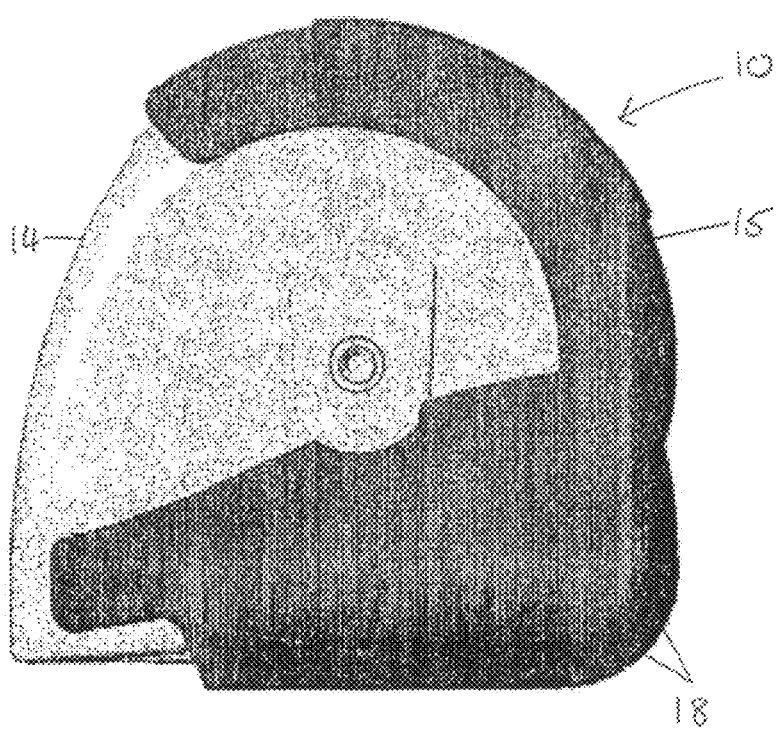
Figure 2:
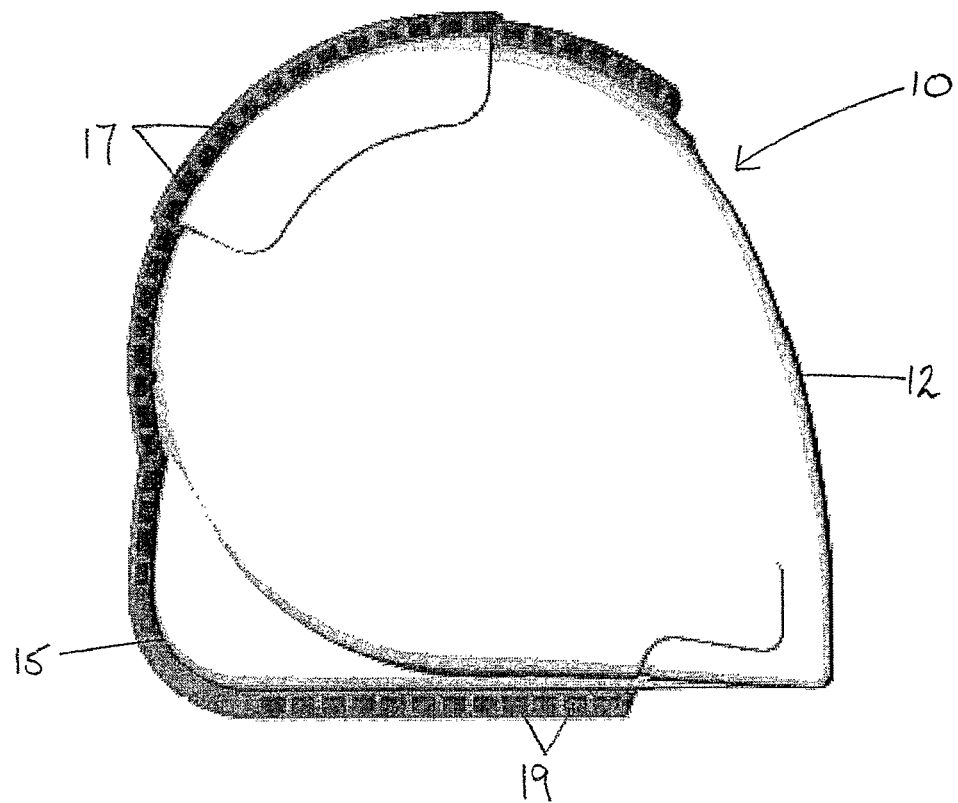
FIG. 2 is a front view of the tape measure housing of FIG. 1a, with the rubber molding on the front half of the housing removed.

FIGS. 1a, 1b and 2 show a tape measure housing 10 for a short tape comprising two halves 12, 14 formed from injection molded plastics material, e.g., ABS. Each half has molded onto it elastomeric material pads 13, 15. The pads 13, 15 have two types of air-filled cavities. The first type are cavities 16, 18 provided in the corner distal from the mouth on the bottom edge of the housing through which a tape spooled in the housing is to be drawn. These cavities extend to the outside of the elastomeric pads, and hence are visible during the normal use of the housing. The cavities 16, 18 do extend to the join between the two halves 12, 14 of the housing 10, as can be seen in FIG. 2, but run parallel to the edge of the housing that joins the front and rear faces.

These cavities 16, 18 protect the vulnerable corner of the housing.

The other type of cavities 17, 19 provided in both elastomeric pads (only shown for pad 15 in FIG. 2) are provided in the pads on the bottom edge of the casing and on the upper edges of the casing and, as above, run parallel to the edge of the housing that joins the front and rear faces. These cavities extend from the join between the two halves of the housing, but do not impinge on the outer surface of the pads, and therefore are not visible during normal use of the housing.

The cavities 16, 17, 18, 19 have a cross-section of about 9 mm$^2$. These cavities protect the edge of the housing.

The cavities 16, 17, 18, 19 can be formed during the molding process. In particular, these types of cavities can be formed by automatic twin shot molding or manual overmolding.

In twin shot molding the plastics material, e.g., ABS, for the case half 12, 14 being molded is injected into a mould tool cavity, and this 'first shot' remains in the mould tool. A portion, which may be half, of the mould tool rotates or moves to expose a new molding cavity, which is an extension of the first molding cavity and is formed at least in part by the plastics material of the first shot. The newly formed molding cavity is filled with the elastomeric material, e.g. TPE, as a 'second shot', and this elastomeric material forms an intimate, adhesive and/or mechanical bond with the plastics material from the first shot. The elastomeric material forms the pads 13, 15. When the mould tool ejects the component after the second shot, the component is fully finished and consists of both the plastics and elastomeric materials. The first and second shot can happen consecutively or simultaneously during an automatic twin shot cycle because the molding machine is fitted with two injection units, one for the plastics material, e.g. ABS and one for the elastomeric material, e.g., TPE. The gas-filled cavities 16, 17, 18, 19 are formed in the elastomeric material due to the shape of the second molding cavity.

In manual overmolding, sometimes termed 'mould-on', the plastic materials for the case half 12, 14 being molded is molded in a conventional molding machine and mould tool in the normal way. The plastics molding which is formed is then manually inserted into a second mould tool. It is common for the second mould tool to be in another molding machine and for the plastics material, e.g., ABS, moldings to be transferred as they are molded (no stock of plastics material parts). Alternatively a stock of plastics material, e.g., ABS, parts is may be produced. The plastics material mould tool in the molding machine is changed for the elastomeric material, e.g. TPE, tool and the stock of plastics material moldings overmolded with elastomeric material.

The molding cavities in the second mould tool are an extension of the molding cavities in the first tool and are formed at least in part by the plastics material of the first shot. The elastomeric material, e.g., TPE, to form the pads 13, 15 is injected into the free molding cavity space and forms an intimate, adhesive and/or mechanical bond with the plastics material. As in twin shot molding, the gas filled cavities 16, 17, 18, 19 are formed in the elastomeric material due to the shape of the second molding cavity.

The tooling for manual overmolding is less complex and therefore cheaper than the tooling for twin shot molding. However, manual overmolding required two distinct molding operations and is labor intensive and can lead to a greater variation in the quality of components.

Figures 3A, 3B, 3C:
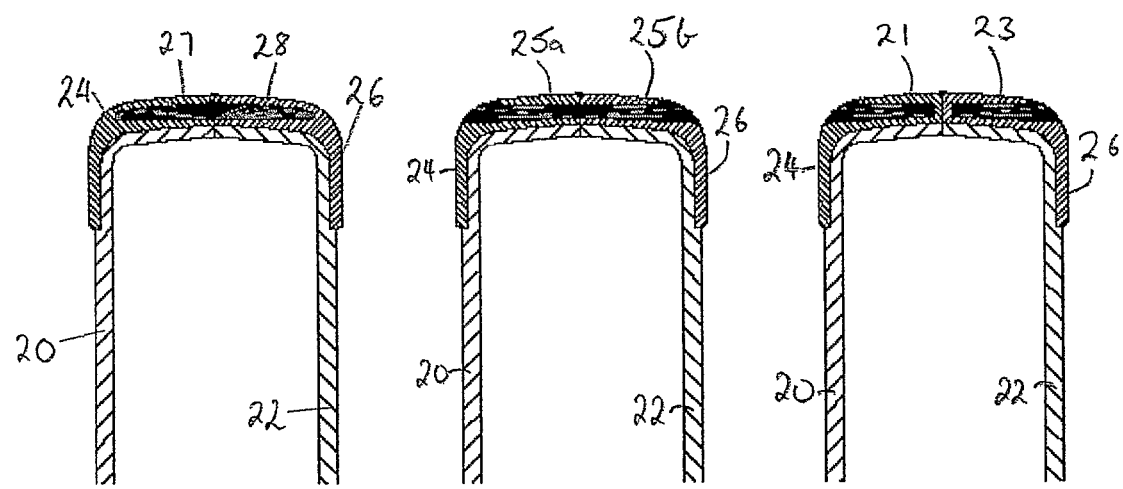
FIGS. 3a to 3c are cross-sectional views of parts of housings according to the present invention.

The types of cavities in FIGS. 1 and 2, and an additional type of cavity, are further illustrated in FIG. 3, which shows cross sections of a tape measure housing comprising two parts 20, 22. Each half of the housing has an overmolded elastomeric pad 24, 26. FIG. 3a shows 'internal' cavities 27, 28 which are equivalent to the cavities 17, 19 around the edge of the housing in FIGS. 1 and 2. FIG. 3c shows 'blind' cavities 21, 23 which are equivalent to the cavities 16, 18 on the corner of the housing in FIGS. 1 and 2. FIG. 3b shows a 'through' cavity 25a, 25b which is combination of the internal' and 'blind' cavities of FIGS. 3a and 3c. The cavities 25a, 25b extend from the join between the two parts of the housing 20, 22 to the outside of the elastomeric pads 24, 26, giving the visual impression of a single cavity which extends across the whole width of the edge of the housing. These 'through' cavities can be formed in the same manner as described above.

Figure 4:
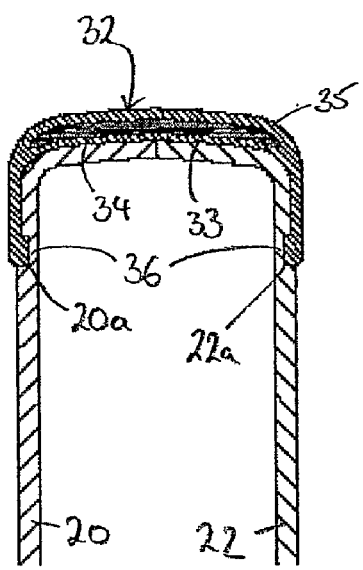
FIG. 4 is a cross-sectional view of a further part of a housing according to the present invention.

FIG. 4 shows a cross section of a tape measure housing having two parts 20 and 22. The elastomeric material 32 comprises a cavity 34 which is sealed from the atmosphere and has an outer wall 35 and an inner wall 33. The cavity extends across the width of the edge of the housing. The elastomeric material engages with the halves of the housing 20 and 22 by means of lugs 36 which engage in complementary recesses 20a and 22a on the halves of the housing. The elastomeric material 32 can therefore provide an additional advantage of holding the two halves 20, 22 of the housing together, depending on its construction. Typically, the elastomeric material 32 will be manufactured separately from the housing 20, 22 and then slipped over it as part of the assembly process.

A process called Gas Injection Molding can be used to form the cavity 34 in the elastomeric material 32, as illustrated in FIG. 4. Before gas injection, the hot elastomeric material covers and seals the molding cavity in the mould, but the quantity of elastomeric material is insufficient to fully fill the molding cavity. During the elastomeric molding process, a carefully metered quantity of gas (for example, nitrogen or carbon dioxide) is injected into the molten elastomeric material. As the flow of gas is turned off, the injection point is automatically sealed by the molten elastomeric material.

The trapped injected gas forces the molten elastomeric material against the walls of the of the molding cavity and forms the required gas filled cavity 34 in the elastomeric material. Gas injection equipment is well known in the molding industry for the manufacture of hollow parts.

It is possible to provide an internal gas filled cavity in elastomeric material which is molded onto the plastics case, as an alternative to the embodiment described above. This may be achieved by using gas injection molding on a twin shot molding tool. Such an embodiment may differ from that illustrated in FIG. 4 by the absence of lugs 36, although these lugs may be used to increase the durability of the molded on elastomeric material 32.

All numbers expressing quantities of ingredients, constituents, reaction conditions, and so forth used in the specification are to be understood as being modified in all instances by the term "about". Notwithstanding that the numerical ranges and parameters setting forth, the broad scope of the subject matter presented herein are approximations, the numerical values set forth are indicated as precisely as possible. Any numerical value, however, may inherently contains certain errors as evident from the standard deviation found in their respective measurement techniques.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

The invention claimed is:

1. A tape measure housing comprising resilient elastomeric material located at its outer surface, the resilient elastomeric material defines one or more gas-filled cavities, each of which is located on a line tangential to an outer wall of the housing between the outer wall of the housing and an outer wall of the resilient elastomeric material, wherein the one or more gas-filled cavities have an opening on at least one outer surface of the elastomeric resilient material.

2. A tape measure housing according to claim 1, wherein the one or more gas-filled cavities have an opening on at least two outer surfaces of the resilient elastomeric material.

3. A tape measure housing according to claim 1, wherein one or more of the gas-filled cavities do not have an opening on at least one outer surface of the resilient elastomeric material.

4. A tape measure housing according to claim 1, wherein at least one of the gas-filled cavities are not open to the atmosphere.

5. A tape measure according to claim 4, wherein the gas in said at least one of the gas-filled cavities is air.

6. A tape measure according to claim 4, wherein the gas in said at least one of the gas-filled cavities is not air.

7. A tape measure housing according to claim 1, wherein at least some of the resilient elastomeric material is molded onto the housing.

8. A tape measure housing according to claim 1, wherein at least some of the resilient elastomeric material is adhered to the housing.

9. A tape measure housing according to claim 1, wherein at least some of the resilient elastomeric material is in the form of a jacket which is slipped onto the housing after the housing is assembled.

10. A tape measuring housing according to claim 1, wherein the housing has two substantially parallel faces which define between them a space for a spooled measuring tape, said space being circumscribed by an edge having a mouth through which said tape could be drawn, and wherein the resilient material which defines the at least one cavity covers the whole width of said edge.

11. A tape measure housing according to claim 10, wherein at least one cavity extends across 50% of more of said width.

12. A tape measure housing according to claim 1, wherein the one or more cavities are filled solely with the gas.

13. A tape measure housing according to claim 1, wherein the housing comprises two substantially parallel faces circumscribed by an edge, and wherein the resilient elastomeric material covers the whole width of the edge and extends over at least a portion of parallel faces.

14. A tape measure housing according to claim 13, wherein the resilient elastomeric material extends along at least 50% of the length of the edge.

* * * * *